United States Patent
Wei et al.

(10) Patent No.: US 11,629,084 B2
(45) Date of Patent: Apr. 18, 2023

(54) METHOD FOR TREATING AN OILY SOLID WASTE SLUDGE

(71) Applicant: CHINA UNIVERSITY OF PETROLEUM BLUE SKY(QINGDAO) PETROLEUM TECHNOLOGY CO., LTD, Qingdao (CN)

(72) Inventors: Weizhong Wei, Qingdao (CN); Zhe Bai, Qingdao (CN); Xinran Li, Qingdao (CN); Haotian Gong, Qingdao (CN); Rongguang Wu, Qingdao (CN); Chuansheng Jia, Qingdao (CN); Biao Yang, Qingdao (CN); Deliang Liu, Qingdao (CN); Zhenhua Sun, Qingdao (CN)

(73) Assignee: CHINA UNIVERSITY OF PETROLEUM BLUE SKY(QINGDAO) PETROLEUM TECHNOLOGY CO., LTD, Qingdao (CN)

( * ) Notice: Subject to any disclaimer, the term of this patent is extended or adjusted under 35 U.S.C. 154(b) by 28 days.

(21) Appl. No.: 17/345,002

(22) Filed: Jun. 11, 2021

(65) Prior Publication Data
US 2021/0387885 A1 Dec. 16, 2021

(30) Foreign Application Priority Data

Jun. 11, 2020 (CN) .......................... 202010531910.8

(51) Int. Cl.
| | | |
|---|---|---|
| *C02F 9/00* | (2023.01) | |
| *C02F 11/13* | (2019.01) | |
| *C02F 11/00* | (2006.01) | |
| *C02F 11/02* | (2006.01) | |
| *C02F 11/127* | (2019.01) | |
| *C02F 101/32* | (2006.01) | |
| *C02F 103/36* | (2006.01) | |

(52) U.S. Cl.
CPC .............. *C02F 9/00* (2013.01); *C02F 11/002* (2013.01); *C02F 11/02* (2013.01); *C02F 11/127* (2013.01); *C02F 11/13* (2019.01); *C02F 2101/32* (2013.01); *C02F 2103/365* (2013.01)

(58) Field of Classification Search
CPC ............ C02F 9/00; C02F 11/002; C02F 11/02
See application file for complete search history.

(56) References Cited

U.S. PATENT DOCUMENTS

| | | | | |
|---|---|---|---|---|
| 5,009,767 A | * | 4/1991 | Bartilucci | ............... C10B 55/00 201/20 |
| 2003/0150801 A1 | * | 8/2003 | Ward | ...................... C02F 11/00 210/610 |
| 2006/0051856 A1 | * | 3/2006 | Maga | ...................... C02F 11/02 435/297.2 |
| 2017/0355979 A1 | * | 12/2017 | Bae | ......................... C02F 3/104 |
| 2020/0123478 A1 | * | 4/2020 | Wu | ...................... B01D 17/047 |
| 2022/0243129 A1 | * | 8/2022 | Huang | ............... B01D 17/0214 |
| 2022/0251456 A1 | * | 8/2022 | Aldugman | ........... C10G 11/182 |

\* cited by examiner

*Primary Examiner* — Chester T Barry

(57) ABSTRACT

The present disclosure provides a solid waste treatment method, including following steps: screening off masses having a particle size greater than 0.5 cm from solid waste; adding extraction agents to the solid waste and then heating and stirring so that the solid waste is fully dispersed in the extraction agents; placing the mixed extraction agent in a centrifuge and centrifuging the mixed extraction feeding liquid phase separated by centrifuging into a rectification tower for rectification and cooling, recovering residual oil substances in a rectification kettle, separating mixture of cooled extraction agents and water, continuously adding the separated extraction agents into an extraction kettle for cyclic extraction, and conveying sewage to a sewage treatment plant to treat and discharging the sewage after the sewage reaches a treatment standard.

10 Claims, No Drawings

METHOD FOR TREATING AN OILY SOLID WASTE SLUDGE

TECHNICAL FIELD

The present disclosure relates to a field of solid waste, and in particular, to a solid waste treatment method.

BACKGROUND

Solid waste refers to a solid or semi-solid waste that is produced by human beings during production and construction, daily life and other activities and cannot be used at certain times and places and is discarded, which pollutes the environment. Oily sludge is a common solid waste in the petrochemical industry, and has characteristics of high oil content, large viscosity, etc., which is difficult to process. The oily sludge contains many petroleum substances, and directly discharging the oily sludge may cause resource waste, and if the treatment is improper, soil and groundwater sources may be polluted, which causes salinization and poisoning, damages and destroys the soil, and toxic materials of the oily sludge may enter food chain system through crops, particularly underground water, and finally directly harms human beings.

In the prior art, most oily sludge is treated in an open-air stacking or landfill manner, if the sludge directly contacts the natural environment, large pollution to the soil, water, and vegetation is caused and waste of petroleum resources is also caused. Therefore, there is an urgent need to provide an effective, non-polluting solid waste treatment method for oily sludge in the petrochemical industry.

SUMMARY

An object of the present disclosure is to provide an effective, non-polluting solid waste treatment method for oily sludge in the petrochemical industry.

In order to achieve the object, the present disclosure provides following technical solutions.

The present disclosure provides a solid waste treatment method, including following steps:

(1) screening off masses having a particle size greater than 0.5 cm from solid waste;

(2) adding extraction agents to the solid waste and then heating to 30-45° C. and stirring for 20-35 minutes so that the solid waste is fully dispersed in the extraction agents; the extraction agents is a mixed extraction agent consisting of a main agent, a secondary agent, and an auxiliary agent; the main agent is a distillate oil having a boiling range of 115-135° C., the secondary agent is a distillate oil having a boiling range of 140-150° C., and the auxiliary agent is a distillate oil with boiling range of 80-100° C.;

(3) placing the mixed extraction agent of step (2) in a centrifuge and centrifuging the mixed extraction;

(4) feeding liquid phase separated by centrifuging into a rectification tower for rectification and cooling, recovering residual oil substances in a rectification kettle, separating mixture of cooled extraction agents and water, continuously adding the separated extraction agents into an extraction kettle for cyclic extraction, and conveying sewage to a sewage treatment plant to treat and discharging the sewage after the sewage reaches a treatment standard;

(5) adding a degrading bacterium agent, rice hull powder, urea, potassium dihydrogen phosphate and water into solid phase separated by centrifuging, and fully mixing the solid phase, the degrading bacterium agent, the rice hull powder, the urea, the potassium dihydrogen phosphate, and the water; and (6) covering product producing by step (5) with a geomembrane and reacting for 3-5 months; the solid waste is oily sludge.

Furthermore, in the step (2), a volume ratio of the main agent, the secondary agent, and the auxiliary agent in the extraction agent is 85-90:4-6:1-3.

Furthermore, the distillate oil in the step (2) is naphtha.

Furthermore, centrifugal treatment conditions in the step (3) are centrifuged for 7-10 minutes under conditions of 2500-2800 revolutions/min.

Furthermore, in the step (5), a mass ratio of the solid phase, the degrading bacterium agent, the rice hull powder, the urea, and the potassium dihydrogen phosphate is 10:(0.1-0.2):(1-2):(1-2):(0.1-0.2).

Furthermore, a preparation method of the degrading bacterium agent in the step (5) is as follows:

S1: fully dissolving polyvinyl alcohol at 75-85° C. and then uniformly mixing the polyvinyl alcohol with sodium alginate solution to obtain a mixed solution;

S2: adding puffed rice to the mixed solution and uniformly mixing the puffed rice and the mixed solution to obtain a solution;

S3: uniformly mixing the solution obtained in the S2 with degrading bacterium solution, then dripping into a calcium chloride saturated boric acid solution with concentration of 30% to form microspheres; and S4: taking the microspheres out of the solution obtained by the S3 after the solution obtained by the S3 is left to stand, and washing the microspheres by sterilized 0.9% NaCl solution to obtain the degrading bacterium agent.

Furthermore, concentration of the puffed rice in the S2 is 4-4.8 g/L.

Furthermore, in the S3, a volume ratio of the solution obtained in the S2 to the degrading bacterium solution is 8-10:1.

Furthermore, the degrading bacterium solution in the S3 is a bacterium solution containing Jones *Acinetobacter*, *Staphylococcus aureus*, *Burkholderia*, and anti-phenolic *Lactobacillus*.

Furthermore, in the S3, a mass ratio of the Jones *Acinetobacter*, the *Staphylococcus aureus*, the *Burkholderia*, and the anti-phenolic *Lactobacillus* in the degrading bacterium solution is (4-5):(5-7):(0.5-1.5):(1.5-2.5).

Beneficial effects of the present disclosure are as follows.

The present disclosure may achieve harmless treatment of solid waste containing oily sludge by firstly extracting combined biological bacteria and degrading the combined biological bacteria which has good treatment effects and does not generate secondary pollution, and oil content in treated solid product is reduced to be less than 0.2%. By selecting the mixed extraction agent, extraction rate is higher than common solvents. The degrading bacterium agent of the present disclosure takes the puffed rice as a carrier, so that not only is adsorption performance is good, but also degradation is achieved, and no secondary pollution is generated.

DETAILED DESCRIPTION

In order to make technical problems, technical schemes and beneficial effects solved by the present disclosure clearer, the present disclosure is further described below in detail with reference to the accompanying drawings and embodiments. It should be understood that the specific embodiments described herein are only used to explain the present disclosure and are not intended to limit the present disclosure.

Embodiment 1

The present disclosure provides a solid waste containing oily sludge treatment method, including following steps:

(1) screening off masses having a particle size greater than 0.5 cm from solid waste;

(2) adding extraction agents to the solid waste and then heating to 30° C. and stirring for 20 minutes so that the solid waste is fully dispersed in the extraction agents; the extraction agents is a mixed extraction agent consisting of a main agent, a secondary agent, and an auxiliary agent; the main agent is a distillate oil having a boiling range of 115-135° C., the secondary agent is a distillate oil having a boiling range of 140-150° C., and the auxiliary agent is a distillate oil having a boiling range of 80-100° C.; a volume ratio of the main agent, the secondary agent, and the auxiliary agent in the extraction agent is 85:4:1; the distillate oil is naphtha.

(3) placing the mixed extraction agent of step (2) in a centrifuge and centrifuging the mixed extraction; centrifugal treatment conditions are centrifuged for 7 minutes under conditions of 2500-2800 revolutions/min.

(4) feeding liquid phase separated by centrifuging into a rectification tower for rectification and cooling, recovering residual oil substances in a rectification kettle, separating mixture of cooled extraction agents and water, continuously adding the separated extraction agents into an extraction kettle for cyclic extraction, and conveying sewage to a sewage treatment plant to treat and discharging the sewage after the sewage reaches a treatment standard;

(5) adding a degrading bacterium agent, rice hull powder, urea, potassium dihydrogen phosphate and water into solid phase separated by centrifuging, and fully mixing the solid phase, the degrading bacterium agent, the rice hull powder, the urea, the potassium dihydrogen phosphate, and the water; a mass ratio of the solid phase, the degrading bacterium agent, the rice hull powder, the urea, and the potassium dihydrogen phosphate is 10:0.1:1:1:0.1.

A preparation method of the degrading bacterium agent is as follows:

S1: fully dissolving polyvinyl alcohol at 75° C. and then uniformly mixing the polyvinyl alcohol with sodium alginate solution to obtain a mixed solution;

S2: adding puffed rice to the mixed solution and uniformly mixing the puffed rice and the mixed solution to obtain a solution; after mixing, concentration of the puffed rice is 4 g/L;

S3: uniformly mixing the solution obtained in the S2 with degrading bacterium solution, then dripping into a calcium chloride saturated boric acid solution with concentration of 30% to form microspheres; a volume ratio of the solution obtained in the S2 to the degrading bacterium solution is 8:1; the degrading bacterium solution is a bacterium solution containing Jones *Acinetobacter, Staphylococcus aureus, Burkholderia*, and anti-phenolic *Lactobacillus*; a mass ratio of the Jones *Acinetobacter*, the *Staphylococcus aureus*, the *Burkholderia*, and the anti-phenolic *Lactobacillus* in the degrading bacterium solution is 4:5:0.5:1.5.

S4: taking the microspheres out of the solution obtained by the S3 after the solution obtained by the S3 is left to stand, and washing the microspheres by sterilized 0.9% NaCl solution to obtain the degrading bacterium agent; and (6) covering product producing by step (5) with a geomembrane and reacting for 3 months.

Embodiment 2

The present disclosure provides a solid waste containing oily sludge treatment method, including following steps:

(1) screening off masses having a particle size greater than 0.5 cm from solid waste;

(2) adding extraction agents to the solid waste and then heating to 35° C. and stirring for 30 minutes so that the solid waste is fully dispersed in the extraction agents; the extraction agents is a mixed extraction agent consisting of a main agent, a secondary agent, and an auxiliary agent; the main agent is a distillate oil having a boiling range of 115-135° C., the secondary agent is a distillate oil having a boiling range of 140-150° C., and the auxiliary agent is a distillate oil with boiling range of 80-100° C.; a volume ratio of the main agent, the secondary agent, and the auxiliary agent in the extraction agent is 88:5:2; the distillate oil is naphtha.

(3) placing the mixed extraction agent of step (2) in a centrifuge and centrifuging the mixed extraction; centrifugal treatment conditions are centrifuged for 8 minutes under conditions of 2600 revolutions/min.

(4) feeding liquid phase separated by centrifuging into a rectification tower for rectification and cooling, recovering residual oil substances in a rectification kettle, separating mixture of cooled extraction agents and water, continuously adding the separated extraction agents into an extraction kettle for cyclic extraction, and conveying sewage to a sewage treatment plant to treat and discharging the sewage after the sewage reaches a treatment standard;

(5) adding a degrading bacterium agent, rice hull powder, urea, potassium dihydrogen phosphate and water into solid phase separated by centrifuging, and fully mixing the solid phase, the degrading bacterium agent, the rice hull powder, the urea, the potassium dihydrogen phosphate, and the water; a mass ratio of the solid phase, the degrading bacterium agent, the rice hull powder, the urea, and the potassium dihydrogen phosphate is 10:0.15:1.5:1.5:0.15.

A preparation method of the degrading bacterium agent is as follows:

S1: fully dissolving polyvinyl alcohol at 80° C.s and then uniformly mixing the polyvinyl alcohol with sodium alginate solution to obtain a mixed solution;

S2: adding puffed rice to the mixed solution and uniformly mixing the puffed rice and the mixed solution to obtain a solution; after mixing, concentration of the puffed rice is 4.5 g/L;

S3: uniformly mixing the solution obtained in the S2 with degrading bacterium solution, then dripping into a calcium chloride saturated boric acid solution with concentration of 30% to form microspheres; a volume ratio of the solution obtained in the S2 to the degrading bacterium solution is 9:1; the degrading bacterium solution is a bacterium solution containing Jones *Acinetobacter, Staphylococcus aureus, Burkholderia*, and anti-phenolic *Lactobacillus*; a mass ratio of the Jones *Acinetobacter*, the *Staphylococcus aureus*, the *Burkholderia*, and the anti-phenolic *Lactobacillus* in the degrading bacterium solution is 4.5:6:1:2.

S4: taking the microspheres out of the solution obtained by the S3 after the solution obtained by the S3 is left to stand, and washing the microspheres by sterilized 0.9% NaCl solution to obtain the degrading bacterium agent; and (6) covering product producing by step (5) with a geomembrane and reacting for 4 months.

Embodiment 3

The present disclosure provides a solid waste containing oily sludge treatment method, including following steps:

(1) screening off masses having a particle size greater than 0.5 cm from solid waste;

(2) adding extraction agents to the solid waste and then heating to 45° C. and stirring for 35 minutes so that the solid waste is fully dispersed in the extraction agents; the extraction agents is a mixed extraction agent consisting of a main agent, a secondary agent, and an auxiliary agent; the main agent is a distillate oil having a boiling range of 115-135° C., the secondary agent is a distillate oil having a boiling range of 140-150° C., and the auxiliary agent is a distillate oil with boiling range of 80-100° C.; a volume ratio of the main agent, the secondary agent, and the auxiliary agent in the extraction agent is 90:6:3; the distillate oil is naphtha.

(3) placing the mixed extraction agent of step (2) in a centrifuge and centrifuging the mixed extraction; centrifugal treatment conditions are centrifuged for 10 minutes under conditions of 2800 revolutions/min.

(4) feeding liquid phase separated by centrifuging into a rectification tower for rectification and cooling, recovering residual oil substances in a rectification kettle, separating mixture of cooled extraction agents and water, continuously adding the separated extraction agents into an extraction kettle for cyclic extraction, and conveying sewage to a sewage treatment plant to treat and discharging the sewage after the sewage reaches a treatment standard;

(5) adding a degrading bacterium agent, rice hull powder, urea, potassium dihydrogen phosphate and water into solid phase separated by centrifuging, and fully mixing the solid phase, the degrading bacterium agent, the rice hull powder, the urea, the potassium dihydrogen phosphate, and the water; a mass ratio of the solid phase, the degrading bacterium agent, the rice hull powder, the urea, and the potassium dihydrogen phosphate is 10:0.2:2:2:0.2.

A preparation method of the degrading bacterium agent is as follows:

S1: fully dissolving polyvinyl alcohol at 85° C. and then uniformly mixing the polyvinyl alcohol with sodium alginate solution to obtain a mixed solution;

S2: adding puffed rice to the mixed solution and uniformly mixing the puffed rice and the mixed solution to obtain a solution; after mixing, concentration of the puffed rice is 4.8 g/L;

S3: uniformly mixing the solution obtained in the S2 with degrading bacterium solution, then dripping into a calcium chloride saturated boric acid solution with concentration of 30% to form microspheres; a volume ratio of the solution obtained in the S2 to the degrading bacterium solution is 10:1; the degrading bacterium solution is a bacterium solution containing Jones *Acinetobacter*, *Staphylococcus aureus*, *Burkholderia*, and anti-phenolic *Lactobacillus*; a mass ratio the Jones *Acinetobacter*, the *Staphylococcus aureus*, the *Burkholderia*, and the anti-phenolic *Lactobacillus* in the degrading bacterium solution is 5:7:1.5:2.5.

S4: taking the microspheres out of the solution obtained by the S3 after the solution obtained by the S3 is left to stand, and washing the microspheres by sterilized 0.9% NaCl solution to obtain the degrading bacterium agent; and (6) covering product producing by step (5) with a geomembrane and reacting for 5 months The strains of the present disclosure are commercially available from China General Microbiological Culture Collection Center (CGMCC) and China Industrial Microbiological Culture Collection Center (CICC), numbers of which are as followings.

A preservation number of the Jones *Acinetobacter* is CGMCC NO. 13206. A preservation number of the *Staphylococcus aureus* is CICC NO. 10999. A preservation number of the *Burkholderia* is CICC NO. 10877. A preservation number of the anti-phenolic *Lactobacillus* is CICC NO. 23825.

In order to more clearly compare results of repairing, the following experiments were performed: solid waste before treatment, treated solid waste, and healthy soil are planted with alfalfa, then observing and recording plant growth conditions, and the results are shown in Table 1.

TABLE 1

| Plant Growth Conditions | | | |
| --- | --- | --- | --- |
| Groups | Solid Waste Before Treatment | Treated Solid Waste | Healthy Soil |
| Stem Weight (mg) | — | 18.2 | 18.9 |
| Root Weight (mg) | — | 13.9 | 36.2 |
| Root Crown Ratio | — | 0.71 | 1.95 |
| Root Length (mm) | — | 40.45 | 37.9 |
| Root Diameter (mm) | — | 0.57 | 0.68 |
| Stem Length (mm) | — | 44.41 | 43.21 |
| Stem Diameter (mm) | — | 0.85 | 0.91 |

As shown in table 1, alfalfa cannot grow on the solid waste before treatment, but grows vigorously on the treated solid waste. Although some of indexes and the healthy soil have a certain gap, indexes of the root length and stem length of alfalfa in the treated solid waste are significantly higher than those of the healthy soil, which indicates that the toxicity of the treated solid waste has been greatly reduced, and is suitable for plant growth.

What is claimed is:

1. A method for treating an oily solid waste sludge, comprising the following steps:

(1) preparing screened solid waste by screening off masses having a particle size greater than 0.5 cm from the oily solid waste sludge;

(2)(a) preparing an extraction agent mixture consisting of a main extraction agent, a secondary extraction agent, and an auxiliary extraction agent wherein the main extraction agent is a distillate oil having a boiling range of 115-135° C., the secondary extraction agent is a distillate oil having a boiling range of 140-150° C., and the auxiliary extraction agent is a distillate oil having a boiling range of 80-100° C., then (2)(b) combining the extraction agent mixture with the screened solid waste sludge and then heating the resulting combination to 30-45° C. and stirring for 20-35 minutes forming a mixed extraction comprising the screened solid waste fully dispersed in the extraction agents;

(3) placing the mixed extraction of step (2)(b) in a centrifuge and centrifuging the mixed extraction thereby forming a less dense liquid fraction and a more dense solids fraction;

(4) feeding the liquid fraction into a rectification tower for rectification and cooling, recovering residual oil substances in a rectification kettle, separating extraction agents from a mixture of cooled extraction agents and water, continuously adding the separated extraction agents into an extraction kettle for cyclic extraction, and conveying sewage to a sewage treatment plant, treating the sewage in the sewage treatment plant, and discharging the treated sewage after the sewage reaches a treatment standard;

(5) adding a degrading bacterium agent, rice hull powder, urea, potassium dihydrogen phosphate and water into the solids fraction and fully mixing the solids fraction, the degrading bacterium agent, the rice hull powder, the urea, the potassium dihydrogen phosphate, and the water; and (6) covering the fully mixed product produced by step (5) with a geomembrane and reacting for 3-5 months.

2. The method according to claim 1, wherein in step (2)(a), the volume ratio of the main extraction agent, the extraction secondary agent, and the auxiliary extraction agent in the extraction agent mixture is 85-90:4-6:1-3, respectively.

3. The method according to claim 1, wherein the distillate oil in step (2)(a) is naphtha.

4. The method according to claim 1, wherein step (3) centrifuging step lasts for 7-10 minutes at a rate of 2500-2800 revolutions/min.

5. The method according to claim 1, wherein in step (5), mass ratio of the solids fraction, the degrading bacterium agent, the rice hull powder, the urea, and the potassium dihydrogen phosphate is 10:(0.1-0.2):(1-2):(1-2):(0.1-0.2).

6. The method according to claim 1, the degrading bacterium agent according to steps S1-S4:

S1: fully dissolving polyvinyl alcohol in water at 75-85° C. and then uniformly mixing the polyvinyl alcohol with a sodium alginate solution to obtain a mixed S1 solution;

S2: adding puffed rice to the mixed solution and uniformly mixing the puffed rice and the mixed solution to obtain an S2 solution;

S3: uniformly mixing the S2 solution with a mixture comprising degrading bacteria to form an S3 solution, then adding the S3 solution dropwise into a saturated boric acid solution comprising calcium chloride to form microspheres; and S4: allowing the microspheres formed in step S3 to settle upon standing, separating the microspheres from the solution obtained by the S3 step, and washing the microspheres with a sterilized 0.9% NaCl solution to obtain the degrading bacterium agent.

7. The method according to claim 6, wherein the concentration of the puffed rice in the S2 solution is 4-4.8 g/L.

8. The method according to claim 6, wherein the volume ratio of the S2 solution to the mixture comprising degrading bacteria is 8-10:1.

9. The method according to claim 6, wherein the mixture comprising degrading bacteria contains Jones *Acinetobacter, Staphylococcus aureus, Burkholderia*, and anti-phenolic *Lactobacillus*.

10. The method according to claim 9, wherein the mass ratio of the Jones *Acinetobacter*, the *Staphylococcus aureus*, the *Burkholderia*, and the anti-phenolic *Lactobacillus* in the mixture comprising degrading bacteria is (4-5):(5-7):(0.5-1.5):(1.5-2.5), respectively.

* * * * *